May 18, 1948. J. J. BLACK 2,441,748
WELDING APPARATUS
Filed Nov. 29, 1945 2 Sheets-Sheet 1
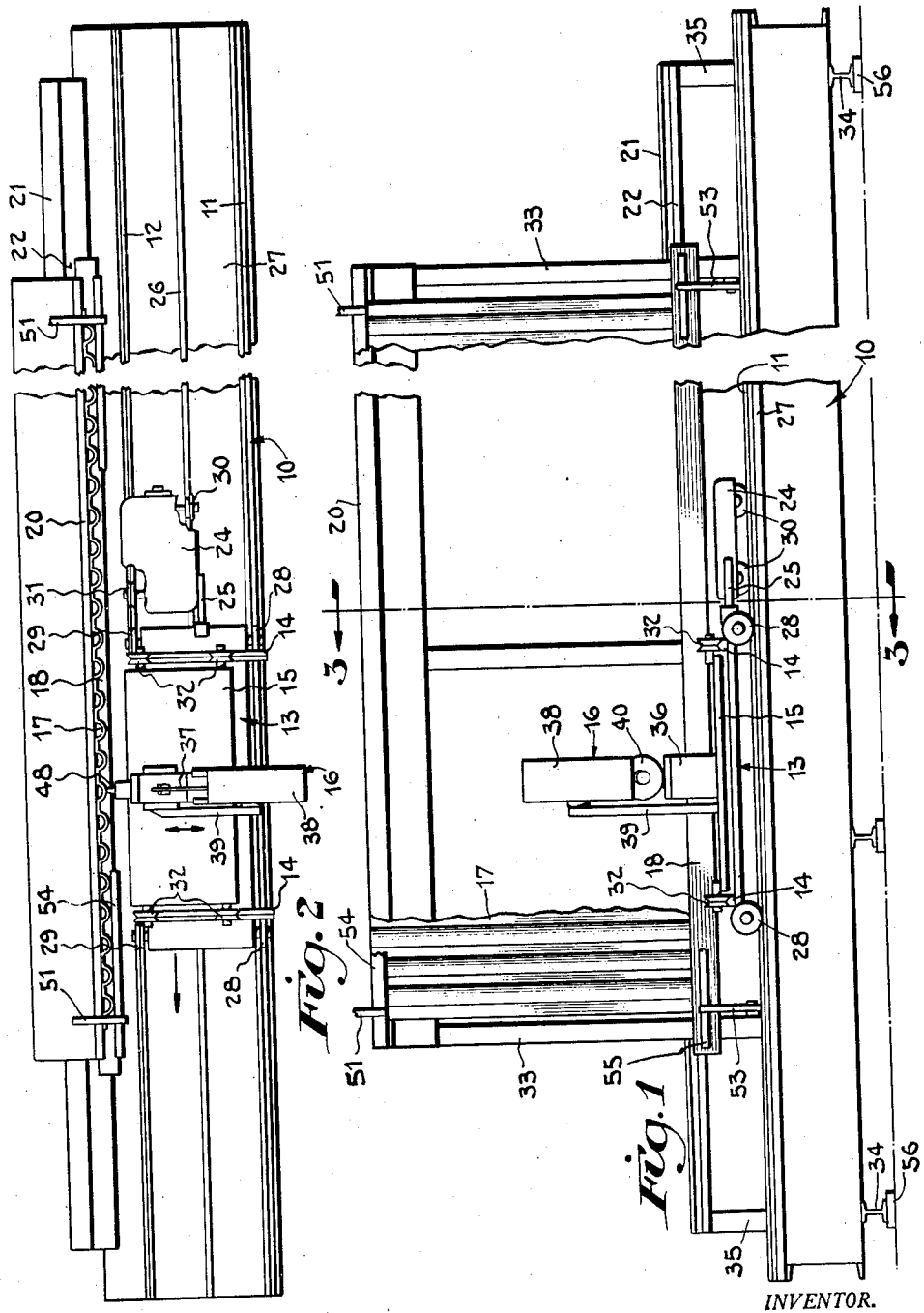
INVENTOR.
James J. Black
BY
Wood, Arey, Herron & Evans
ATTORNEYS May 18, 1948.    J. J. BLACK    2,441,748
WELDING APPARATUS
Filed Nov. 29, 1945    2 Sheets-Sheet 2
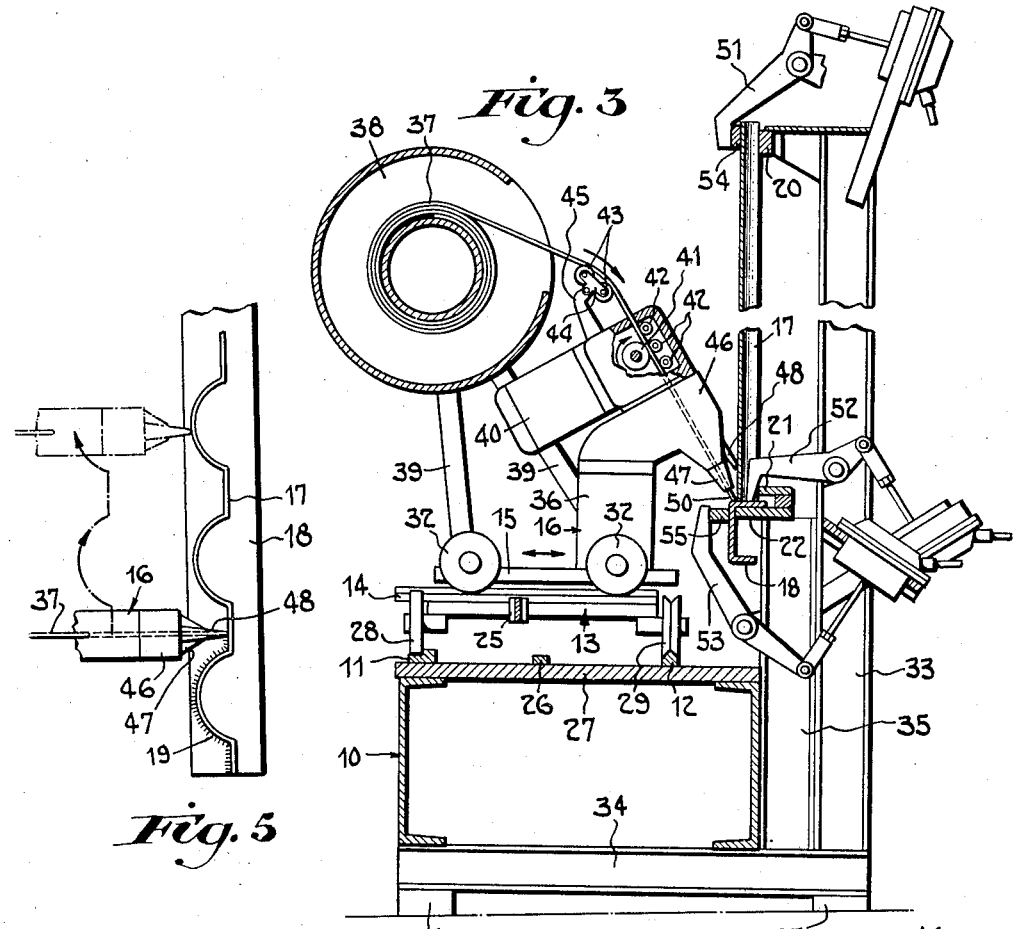
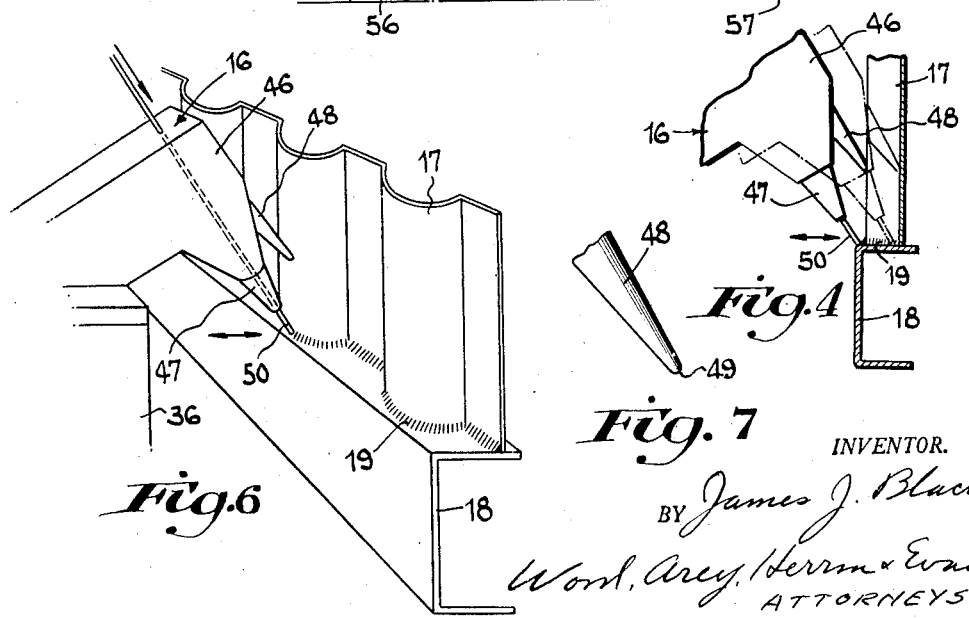
INVENTOR.
BY James J. Black
ATTORNEYS Patented May 18, 1948

2,441,748

UNITED STATES PATENT OFFICE 2,441,748

WELDING APPARATUS

James J. Black, Cincinnati, Ohio, assignor to The Trailmobile Company, Cincinnati, Ohio, a corporation of Delaware Application November 29, 1945, Serial No. 631,559

15 Claims. (Cl. 219—8)

The invention relates to welding and is particularly directed to an apparatus for depositing a continuous weld along an irregular path corresponding to the surface contour of a work section. More specifically, the apparatus is designed to apply a fillet weld along the juncture of angularly related work surfaces, the weld following the surface contour longitudinally of the vertical surface.

In the disclosed embodiment, the apparatus is particularly applied to the welding of irregular work sections to sections having a relatively straight surface, the parts being held together in angular relationship for the welding or joining operation. This class of work may be exemplified in the welding of corrugated sheet metal panels or wall sections angularly to relatively flat base plates or channels. Such construction is extensively followed, for example, in the fabrication of truck and trailer bodies.

Although designed particularly for the more difficult class of corrugated or irregular work, the apparatus is applicable with equal facility to work sections having in both instances relatively plane surfaces.

This type of welding especially with respect to corrugated or irregular sections of substantial length, is tedious and expensive when performed manually. The operator is subject to fatigue, and the exercise of skill and care is necessary to assure a weld of good quality and of uniform appearance. Also, because of the length of the weld, a considerable quantity of weld rod is required, thus requiring the operator to interrupt his work frequently to replace welding rods.

It is the concept of the inventor to provide an apparatus for welding together irregular work sections, the sections disposed angularly to each other, and the path of the weld guided by a follower, or followers, in contact with the irregular surface, or surfaces, in close proximity to the weld, whereby the weld line automatically conforms to the irregular line contour.

The apparatus essentially comprises a longitudinally translatable welding unit preferably of the electric or electric arc type arranged to traverse and follow the contour of an irregular work section longitudinally by means of a follower in contact with the work surface. The welding unit, in the disclosed embodiment, is guided in a fixed plane horizontally, substantially parallel with the plane horizontal work section, and deposits the weld at an area at or near the vertex of the two sections, to join them together.

The translatable welding unit preferably utilizes a continuous bare welding rod or electrode, carried in coil form and automatically fed to the welding zone, the feed rate being governed automatically. The apparatus may operate continuously across the work section and ordinarily completes the weld in one pass.

It is therefore an object of the invention to provide a welding apparatus adapted to deposit a continuous weld longitudinally along the juncture of relatively angularly disposed work sections, the weld automatically guided with respect to, and following, the surface contour of one or the other sections, or both.

It is another object of the invention to provide a welding apparatus, capable of being set up for automatic operation and adapted to the fabrication of longitudinally irregular work sections creating a weld line of uniform quality at a production rate of operation.

It is a further object to provide an apparatus for depositing a weld longitudinally along a relatively thin work panel and by the provision of a longitudinal gauge rail behind the panel and a follower exerting pressure against the opposite side of the panel adjacent the rail and in close proximity to the welding rod, to progressively align the panel with reference to the rail as the welding progresses.

Further objects and advantages will be more fully apparent from a detailed description of the drawings, in which:

Figure 1 is a front view generally illustrating the present apparatus, showing the general arrangement of parts with work sections in place for welding.

Figure 2 is a top plan view of Figure 1.

Figure 3 is a transverse section taken on line 3—3, Figure 1, further detailing the organization, with the welding unit shown in relationship to the work sections.

Figure 4 is an enlarged fragmentary view diagrammatically illustrating the transverse movement of the welding unit with reference to the work sections.

Figure 5 is a diagrammatic plan view of a portion of the work, further illustrating the path of movement of the welding unit and follower.

Figure 6 is a perspective view further illustrating the action of the welding unit with reference to the work sections.

Figure 7 is an enlarged side view detailing the operating end of the follower.

Referring specifically to the drawings representing one embodiment of the invention, the apparatus comprises, in general, a longitudinal base 10, providing a pair of rails 11 and 12 coextensive therewith and upon which is mounted a longitudinally translatable carriage, generally indicated at 13.

The carriage includes, on its upper surface, a pair of rails 14 upon which is mounted a transversely movable floating platform indicated at 15 carrying a welding unit generally indicated at 16. The welding unit therefore is adapted to traverse the base longitudinally and is free to move transversely during its longitudinal movement. It is therefore adapted to follow an irregular longitudinal path corresponding to the contour of the work section mounted longitudinally of the base and parallel therewith as hereinafter disclosed.

The welding unit is guided with respect to the work by means of a follower as a part thereof, the follower being arranged to contact the vertical surface of a work section. Since the unit is free to move transversely as well as longitudinally, it therefore closely follows the contours of the vertical surface as it is moved longitudinally along it.

The work pieces or sections illustrated represent a typical example of the class of work to which the apparatus is particularly adapted. The work section 17 represents a vertically corrugated wall or panel to be joined angularly to a longitudinal channel member 18. In the present instance, the two members are disposed at right angles to each other to be joined at their juncture by a fillet weld indicated at 19, see Figures 4, 5, and 6.

The work sections are supported in fixed angular relationship by means of holding clamps or fixtures. In the present instance, a pair of upper and lower abutment rails or stops 20 and 21 respectively are provided. These serve to maintain the vertical wall section in position upon the channel section 18. A rail 22 is provided to support the channel section 18. The respective rails 20, 21, and 22 extend longitudinally parallel with the base to accommodate work sections of substantial length.

In order to adapt the apparatus for automatic operation, the carriage may include a propeller or power drive unit 24 connected to the carriage by means of a connecting link 25. This unit is mounted upon wheels or rollers, two of which ride upon the rail 12 of the base while the two at the opposite side ride upon a rail 26 provided for this purpose. The propelling unit is preferably powered by a variable speed electric motor in driving connection with the wheels, thereby serving to translate the carriage assembly longitudinally relative to the work sections.

More specifically described, the base 10 includes a horizontal plate 27 upon which is secured the rails 11, 12, and 26. The carriage 13 includes two sets of wheels or rollers 28 and 29 respectively at opposite sides. The rollers 28 have a flat face, the rail 11 having a correspondingly flat top surface to accommodate these rollers. The rail 12 is of an inverted V-shape in cross section and the rollers 29 have a V-groove corresponding to the rail. This V-shaped rail serves to center the rollers thereon and confine the carriage to a straight path in its longitudinal movement upon the base.

The third rail indicated at 26 upon which the propeller rides has a flat upper surface to receive a set of flanged wheels 30 at one side of the propeller. The set of wheels or rollers at the opposite side of the propeller rides upon the V-shaped rail 12, these rollers having a V-groove as indicated at 31 (see Figure 2).

The transversely movable or floating platform 15 upon which the welding unit is mounted is supported by four rollers 32, having grooved faces. These rollers ride upon a pair of rails 14 having a V-shape in cross section, mounted upon the top of the carriage 13 at right angles to the base.

The rollers 32 engaged upon the V-rails 14 are centered thereon preventing any substantial side play and confining the platform 15 to a straight pat at right angles to the base. The platform thus withstands the side thrust exerted by the follower as the follower cams against the vertical irrregularities of the work section.

In the present instance, the work sections are disposed in right angular relationship to each other; therefore, the rails 20, 21, and 22 are disposed to support the sections in this relationship. The upper rail 20 may be supported by vertical I-beam posts 33 having their lower ends secured to a relatively horizontal I-beam 34. The lower rails 21 and 22 are likewise supported by vertical I-beam posts 35, these being relatively shorter than the I-beam posts 33 and likewise secured upon the horizontal I-beam 34.

The welding unit may be urged into contact with the work surface either by gravity or by means of springs or other mechanical or electrical apparatus. In the present instance, this is accomplished by means of gravity, the entire assembly being canted slightly to the rear to incline the base and carriage rearwardly in a transverse direction, thus causing the platform 15 to roll upon the rails 14 toward the work. If desired, the rollers or wheels 32 may include roller or ball bearings to minimize friction losses and facilitate this function.

The welding unit 16 is mounted upon a pedestal 36 secured to the platform 15. This unit may be in the form of any commercial structure providing continuous automatic operation best adapted to the present apparatus. In the present instance, it is exemplified by an electric arc-welder utilizing a continuous bare electrode rod carried in reel form as indicated at 37. This reel is carried by a drum 38 likewise mounted upon platform 15 by means of struts 39. The continuous welding rod 37 is fed automatically by means of a variable speed electric motor 40 having appropriate transmission gearing and driving a feed roller 41 which may have a knurled face. This roller bears against the welding rod and is rotated in the appropriate direction and at a proper speed to feed the rod to the welding zone at the necessary rate of movement. The feeding apparatus also includes a plurality of smaller rollers 42 which serve to straighten the rod and cause it to bear against the feed roll 41. A pair of rollers 43—43 are additionally provided between the feed mechanism and the reel 37 and serves to guide the rod into the feed mechanism. These rollers 43 are loosely mounted within a bracket 44 which in turn may be swiveled upon a fixed bracket 45 secured to the feed mechanism.

The rod, after leaving the feed mechanism of the welding unit 16 passes through a welding head 46, the lower end of which includes an electrode guide 47 which serves to present the rod at the proper angle with its axis in proper relationship with the work surfaces.

The follower 48 previously mentioned, is mounted in the welding head 46 slightly above the guide 47 and substantially parallel with the axis of the welding head and serves to guide the head and maintain the proper relationship between the end of the welding rod and the work surface and to guide the rod in a path closely following the surface contours. For this purpose the follower is presented to the work surface in close proximity to the welding zone.

In order to permit the follower to overcome minor obstructions in its path, for example abrupt vertical seams, it is provided with a rounded end or contact surface as indicated at 49, see Figure 7. This end radius is sufficient to permit it to overcome such obstructions by climbing over them. An adjustable mounting (not shown) may be provided for the follower if this is desired.

The electrode guide 47 provides a sliding fit for the welding rod 37 passing therethrough and serves to feed the rod into the welding zone. That section of rod indicated at 50, on leaving the guide 47 makes electrical contact with the work surface in the manner practiced in arc welding, thereby forming an electric arc, causing the rod to fuse and form a continuous fillet-weld as indicated at 19, see Figures 4, 5, and 6.

The apparatus as outlined above is intended to serve as an example of one of several types of operation. It will be apparent that other types of welding processes may be utilized in conjunction with the apparatus such as gas welding or the process known as submerged melt welding.

As described, the apparatus may be set up for automatic production welding. For this purpose, various automatic control apparatus may be utilized. The longitudinal traverse speed may be determined by control of the variable speed motor driving the propeller 24. The electrode or rod feed may be automatically controlled by varying the speed of the feed motor 40. This feed may be independent of the traverse speed and controlled electrically. In this class of electric welding, the welding voltage varies proportionately with the distance between the end of the rod and the piece being welded. Therefore, a voltage control unit may be utilized to maintain uniform conditions in the fusion zone of the weld. The voltage control unit utilizes variations in voltage across the welding zone to regulate the current supplied to the feed motor 40 thereby controlling its rod feeding rate. This control unit may be entirely automatic to maintain the welding voltage at any predetermined value and may be set for a wide range of welding conditions. Suitable welding transformers or other sources of power supply are, of course, necessary in the operation of the apparatus. The welding voltage is connected to the work in the usual manner, one side of the circuit being introduced into the welding rod in an appropriate manner in the feeding zone, and the other side of the circuit connected to the work.

It will be apparent therefore that the longitudinal feed, the welding voltage, and feed rate are capable of being pre-set to meet specified welding conditions, as determined by experiment, and that these settings may be utilized in subsequent welding operations. Once the apparatus is properly set up, it is capable of automatic operation and will produce work of a uniform good quality on a production basis and without the requirement of a skilled operator.

In order to facilitate the holding of the work sections, power operated clamping fixtures are provided to engage the work at appropriate points to hold the same in fixed angular relationship. As shown in Figure 3, pneumatically operated clamping arms, 51, 52, and 53 may be provided.

The fixture 51 is located adjacent the top rail 20 and includes a longitudinal clamp rail 54 extending longitudinally across the work which serves to clamp the work snugly against the rail 20. The fixture 52 in the present instance operates upon the upper face of the channel shaped work section 18 to clamp it firmly upon the rail 22. The fixture 52 is designed to contact the channel within the confines of the corrugated vertical channel as shown in Figure 3 and for this purpose a plurality of these fixtures may be installed serially with respect to the channel 18. The fixture 53 clamps the channel 18 in a horizontal direction snugly against the rail 22. For this purpose, the fixture 53 includes a longitudinal rail 55 similar to the rail 54 extending longitudinally across the face of the work.

These fixtures facilitate setting up the work in the machine permitting rapid placement of the work and removal thereof after it has been welded. As disclosed, the lower end of the corrugated panel rests against the rail 21 which, in turn, is mounted upon the rail 22. This rail therefore acts as an abutment for the work against the pressure of the follower 48, and serves to hold the panel in a straight line with respect to the channel, the pressure of the follower 48 being sufficient to remove slight irregularities such as may be due to buckling or springing of the sheets. Since this follower travels in line with the welding electrode and is disposed relatively close to the welding zone, the follower serves to position the work at the same time it is being welded. Also, the fact that it is close to the zone of welding aids in the proper guiding of the weld line since it will not be affected by irregularities in the upper section of the panel.

It will be apparent that the machine may be set up for work which is other than at right angles by changing the location of the rails with respect to each other. It will also be apparent that it may be applied to the welding of relatively flat sheets, the weld in this instance describing a relatively straight line with any fixed irregularities in the sheet compensated for by the follower 48. Buckling or springing of the sheet will be removed due to the sheet being pressed between the follower and the rail 21 as above described.

As indicated in the diagrammatic view Figure 4 the welding head, electrode and follower 48 move relatively horizontally in following and conforming to the configuration of the corrugated panel. The straight line motion is determined by the rails 14 of the carriage, the top plate 27 of the base, the carriage 13 and the abutment rail 22 all being parallel with each other in a transverse direction thereby confining the welding rod to movement in a straight parallel line with reference to the top of the channel 18 being welded.

The camming action of the follower 48 with reference to a corrugated sheet is diagrammatically illustrated in Figure 5. The movement here exemplifies a more difficult class of work wherein the weld follows a combination of curved and straight lines with abrupt changes in direction. It will, of course, be recognized that the machine is applicable to a wide range of configurations having either curved or straight contours or a combination of these.

In the operation of the machine it is desirable that the welding unit be translated across the work surface at a uniform rate of speed to produce a uniform weld. The rate of speed, moreover, is determined by the character of the work, the type and weight of metal, contour and other factors. For example, a feed of twenty inches per minute may be representative of the proper speed for one particular class of corrugated work. A straight or plane work section would therefore require a considerable decrease in order to maintain the same linear feed rate of the rod with respect to the work surface.

The size or bulk of the weld deposited is determined by the feeding rate of the welding rod relative to the work. This is determined by controlling the speed of the propeller or power unit 24. Since the power unit moves at a uniform rate of speed, the weld deposited is relatively uniform in bulk and width.

As shown, the apparatus is tilted or canted rearwardly as a unit to impart a sufficient slant to the base plate 27 and cause the platform 15 and welding unit to roll by gravity on the rails 14 toward the work. The follower is thus forced against the work surface with considerable pressure as determined by the degree of slant and the weight of the unit. As the carriage advances longitudinally, the follower which acts in effect as a cam follower, forces the work against the lower rail 22 causing it to line up with this rail as it is being welded. When the follower encounters an obstruction or an irregularity, it forces the entire unit rearwardly following the contour of the obstruction or irregularity.

In the present embodiment, the machine is tilted rearwardly from a vertical line by means of removable blocks, 56 and 57 at the front and rear respectively. The blocks 56 along the forward end of the machine are slightly higher than the blocks 57 at the rear thereof in order to cant the assembly. If desired, adjustable means, such as jacks, may be utilized to effect this condition since various working conditions such as metal thickness or welding speed may require greater or less pressure.

The apparatus is designed to complete the welding in one pass across the work under normal working conditions. In welding extremely heavy metals however it may be necessary to make more than one pass in order to build up a fillet of sufficient bulk and strength to meet the requirements.

It will be apparent that the present disclosure represents one embodiment of the invention and that various alterations and modifications may be made without departing from the spirit of the invention.

Having described my invention, I claim:

1. An apparatus of the character described comprising: a base, a longitudinally translatable carriage mounted upon said base substantially horizontal transverse guide rails mounted on said carriage, a transversely movable welding unit mounted upon said guide rails, means for urging said welding unit toward a work surface, and means in contact with said work surface for guiding said unit relative to the contour of the work surface.

2. An apparatus of the character described comprising: a base, a longitudinally translatable carriage disposed upon said base, a transversely movable support member mounted on said carriage for substantially horizontal movement, a welding unit, including a welding rod, mounted upon said support member, and guide means on said welding unit in contact with the work surface to guide the welding unit and rod relative to an irregular work surface contour.

3. An apparatus of the character described comprising: a base, a longitudinally translatable carriage disposed upon said base substantially horizontal transverse guide rails on said carriage, a transversely movable support member carried upon said guide rails, a welding unit mounted upon said support member, said carriage disposed in an inclined plane transversely to cause said support member and welding unit to be urged by gravity toward a work surface, a follower associated with said welding unit said follower disposed in position to follow the surface contour of a work surface, and means for supporting the work relative to said welding unit.

4. A welding apparatus comprising: a base including guideways, a substantially horizontally translatable carriage mounted on said guideways, a horizontal cross slide mounted on said carriage, a welding device mounted on said slide, work supporting fixtures mounted adjacent said base, said welding device including an automatically advanced welding rod and a contact finger, said contact finger disposed in position to engage the work so as to guide the welding rod with respect to the line of welding contact.

5. In a welding machine, a welding unit, means supporting said welding unit for longitudinal and transverse movements in substantially a horizontal plane, said welding unit including a welding rod and a guide means adjacent thereto, work supporting means relative to said welding unit, said guide means disposed in position to engage the work for guiding the welding contact relative to the contours thereof.

6. An apparatus of the class described comprising: a base, work supporting means fixed relative to said base, said work supporting means constructed and arranged to hold plates in angular relationship and in abutment, one or more of said plates having an irregular contour, and a welding unit including a guide element disposed in position to contact said irregular plate for guiding the welding unit in a horizontal transverse plane to deposit a weld relative to the juncture of the plates.

7. An apparatus of the class described comprising: a base, a longitudinally translatable carriage disposed upon said base, a transversely substantially horizontally movable slide member supported upon said carriage, a welding unit mounted on said support slide, means for supporting angularly abutting work plates alongside said base, said carriage disposed in an inclined plane transversely toward said work plates so that said support slide is urged by gravity toward the plates to be welded, and a guide finger on the welding unit for guiding the welding unit relative to a welding line.

8. An apparatus of the character described comprising: a base, a welding unit, means for supporting said welding unit for longitudinal and transverse movements in a horizontal plane, means for normally urging said welding unit transversely, work fixtures for supporting angularly related plates in contact, guide means on the welding unit engaging one of the plates to guide the unit relative to an irregular work surface contour and for guiding the welding unit along the line of contact of said plates.

9. An apparatus of the character described comprising: a base, a longitudinally translatable carriage mounted upon said base, a substantially horizontally transversely movable welding unit mounted upon said carriage, means for urging said welding unit toward a work surface of angularly related abutting plates, guide means in contact with the work surface for guiding said unit in a substantially horizontal path relative to the contour of one of the work surfaces, and an automatically fed welding rod in said welding unit adapted to engage the line of contact of the plates for depositing a weld.

10. An apparatus of the character described comprising: a base, a longitudinally translatable carriage disposed upon said base, a support member carried upon said carriage for movement in a transverse substantially horizontal path, a welding unit mounted upon said support member, said welding unit urged by gravity toward the line of abutment of angularly related work surfaces, a follower mounted upon said welding unit said follower engaged against a work surface to cause the welding unit to follow the surface contour of one of the work surfaces, and means for supporting the work relative to said welding unit.

11. A welding apparatus comprising: a base including guideways, a translatable carriage mounted on said guideways, a substantially horizontal cross slide mounted on said carriage, a welding device mounted on said slide, work supporting fixtures mounted adjacent said base for supporting angularly abutted plates, said welding device including an automatically advanced welding rod and a contact finger, said contact finger disposed in position to engage one of the work surfaces so as to guide the welding rod with respect to the line of abutment of the plates.

12. In a welding machine, a welding unit, means supporting said welding unit for longitudinal and transverse movements in a substantially horizontal plane said welding unit including a welding rod and a guide finger projected from the welding unit adjacent to the welding rod, work supporting means relative to said welding unit for supporting plates in angularly abutted relationship, said guide finger disposed in position to engage the work contour for guiding the welding rod contact relative to the line of contact of the plates.

13. An apparatus of the class described comprising: a base, work supporting means fixed relative to said base, said work supporting means adapted to hold plates in angular relationship and in abutment, one or more of said plates having an irregular contour, a welding unit including a guide follower engaging one of the plates for guiding the application of the weld relative to the juncture of the plates, means for urging the welding unit toward said juncture in a substantially horizontal path and movement and means for feeding said welding unit along said base longitudinally of said juncture.

14. An apparatus of the class described comprising: a base, a longitudinaly translatable carriage disposed upon said base, a slide member supported upon said carriage, a welding unit mounted on said support slide for transverse movement substantially in a horizontal path means for supporting angularly abutting plates to be welded alongside said base, said support slide urged toward the plates to be welded, and a finger projected from said welding unit and disposed in position for guiding the welding unit relative to the line of contact of the plates.

15. An apparatus of the character described comprising: a base, work fixtures for supporting plates to be welded in angular contact, a welding unit, means for supporting said welding unit for longitudinal and transverse movements in a substantially horizontal path means for normally urging said welding unit transversely, means for feeding the unit longitudinally of the angular contact of the plates, means on the welding unit engaging one of the plates for adapting the unit to follow an irregular work surface contour, and a welding deposit means on the welding unit guided along said line of contact of the plates for welding the plates together.

JAMES J. BLACK.

REFERENCES CITED

The following references are of record in the file of this patent:

UNITED STATES PATENTS

| Number | Name | Date |
|---|---|---|
| 1,481,071 | Sindelar et al. | Jan. 15, 1924 |
| 1,884,644 | Ford | Oct. 25, 1932 |
| 1,910,259 | Raymond | May 23, 1933 |
| 2,259,976 | Harvard | Oct. 21, 1941 |
| 2,357,376 | Baird | Sept. 5, 1944 |